US009218695B2

(12) United States Patent
Yu (10) Patent No.: US 9,218,695 B2
(45) Date of Patent: Dec. 22, 2015

(54) SYSTEM AND METHOD FOR MONITORING AN ESTIMATED WHEEL SPEED OF A VEHICLE USING A TRANSMISSION OUTPUT SHAFT SENSOR (71) Applicant: Robert Bosch GmbH, Stuttgart (DE)

(72) Inventor: Zerong Yu, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 13 days.

(21) Appl. No.: 13/906,908

(22) Filed: May 31, 2013

(65) Prior Publication Data

US 2014/0188352 A1 Jul. 3, 2014

Related U.S. Application Data (60) Provisional application No. 61/746,205, filed on Dec. 27, 2012.

(51) Int. Cl.
  *G07C 5/08* (2006.01)
  *B60W 50/02* (2012.01)
  (Continued)

(52) U.S. Cl.
  CPC ............ *G07C 5/0816* (2013.01); *B60G 17/019* (2013.01); *B60G 17/0182* (2013.01); *B60G 17/0185* (2013.01); *B60G 17/0195* (2013.01); *B60T 8/885* (2013.01); *B60W 40/10* (2013.10); *B60W 50/0205* (2013.01); *G01P 21/02* (2013.01); *B60G 2400/208* (2013.01); *B60G 2400/302* (2013.01); *B60G 2600/02* (2013.01); *B60G 2600/042* (2013.01); *B60G 2600/082* (2013.01); *B60G 2600/12* (2013.01); *B60G 2800/702* (2013.01); *B60G 2800/802* (2013.01); *B60G 2800/94* (2013.01);
  (Continued)

(58) Field of Classification Search
  CPC ................................ B60T 8/32; B60C 23/061
  USPC .............................................. 701/51; 340/444
  See application file for complete search history.

(56) References Cited

U.S. PATENT DOCUMENTS 4,260,942 A 4/1981 Fleming
5,562,327 A 10/1996 Fennel et al.
(Continued)

FOREIGN PATENT DOCUMENTS

DE 19610864 9/1997
EP 0369179 5/1990
(Continued)

OTHER PUBLICATIONS

International Search Report and Written Opinion for Application No. PCT/US2013/075042 Dated Jun. 4, 2014 (13 pages).

*Primary Examiner* — John R Olszewski
*Assistant Examiner* — Jason Roberson
(74) *Attorney, Agent, or Firm* — Michael Best & Friedrich LLP (57) ABSTRACT

Methods and systems are described for monitoring a determined wheel speed of a wheel. A three wheel speed values—each indicative of a measured wheel speed of a different wheel—are each received from a different wheel speed sensor. An estimated wheel speed value for a fourth wheel is determined based on at least one of the three wheel speed values. A calculated wheel speed value is determined based on information received from a vehicle system. A fault condition is detected based on deviations between the estimated wheel speed value for the fourth wheel and the calculated wheel speed value for the fourth wheel.

16 Claims, 3 Drawing Sheets

(51) Int. Cl.

| | | |
|---|---|---|
| *B60G 17/018* | (2006.01) | |
| *B60G 17/0185* | (2006.01) | |
| *B60G 17/019* | (2006.01) | |
| *B60G 17/0195* | (2006.01) | |
| *B60T 8/88* | (2006.01) | |
| *B60W 40/10* | (2012.01) | |
| *G01P 21/02* | (2006.01) | |

(52) U.S. Cl.
CPC ....... *B60T 2260/04* (2013.01); *B60T 2270/413* (2013.01); *B60T 2270/416* (2013.01); *B60W 2400/00* (2013.01); *B60W 2520/28* (2013.01)

(56) References Cited

U.S. PATENT DOCUMENTS

| | | | |
|---|---|---|---|
| 5,612,880 | A | 3/1997 | Kojima et al. |
| 5,642,280 | A | 6/1997 | Negrin et al. |
| 5,657,829 | A * | 8/1997 | May .............................. 180/197 |
| 5,670,716 | A * | 9/1997 | Tamasho et al. .............. 73/146.2 |
| 6,027,184 | A * | 2/2000 | Yonemura et al. ............ 303/186 |
| 6,285,280 | B1 * | 9/2001 | Wang ............................ 340/444 |
| 7,569,948 | B2 | 8/2009 | Davis et al. |
| 7,792,617 | B2 | 9/2010 | Joyce et al. |
| 8,027,771 | B2 | 9/2011 | Martini et al. |
| 2003/0102180 | A1 * | 6/2003 | Badenoch et al. ............. 180/446 |
| 2003/0167116 | A1 | 9/2003 | Erban |
| 2007/0265756 | A1 * | 11/2007 | Joyce et al. ...................... 701/51 |
| 2010/0256887 | A1 | 10/2010 | Linda et al. |
| 2011/0127097 | A1 | 6/2011 | Hodzic et al. |
| 2012/0029727 | A1 | 2/2012 | Malik |
| 2012/0214641 | A1 | 8/2012 | McCann et al. |
| 2012/0226469 | A1 * | 9/2012 | Premkumar et al. .......... 702/148 |

FOREIGN PATENT DOCUMENTS

| | | |
|---|---|---|
| JP | H08318836 | 12/1996 |
| JP | S6357360 | 3/1998 |

* cited by examiner

SYSTEM AND METHOD FOR MONITORING AN ESTIMATED WHEEL SPEED OF A VEHICLE USING A TRANSMISSION OUTPUT SHAFT SENSOR

RELATED APPLICATIONS

This application claims the benefit of U.S. Provisional Patent Application No. 61/746,205, filed on Dec. 27, 2012 and entitled "SYSTEM AND METHOD FOR MONITORING AN ESTIMATED WHEEL SPEED OF A VEHICLE USING A TRANSMISSION OUTPUT SHAFT SENSOR," the entire contents of which are incorporated herein by reference.

BACKGROUND

The present invention relates to systems and methods for monitoring individual wheel speeds of a multiple wheel vehicle such as, for example, a car or truck.

SUMMARY

Some modern vehicles include one or more electronic control units ("ECUs") configured to control various operations of the vehicle. For example, some vehicles include an electronic stability control ("ESC") system or other vehicle subsystems to control the stability of a vehicle as it encounters various driving conditions. Constructions of the invention described herein use three wheel speed sensors to estimate the speed of the fourth wheel of the vehicle. Individual wheel speeds are then used to activate and control the operation of various vehicle subsystems (e.g., the ESC system). The electronic control system also calculates an estimated wheel speed based on information received from a transmission output shaft sensor ("TOSS") and monitors for deviations between the estimated and calculated wheel speeds.

In one embodiment, the invention provides a method of monitoring a determined wheel speed of a wheel. A three wheel speed values—each indicative of a measured wheel speed of a different wheel—are each received from a different wheel speed sensor. An estimated wheel speed value for a fourth wheel is determined based on at least one of the three wheel speed values. A calculated wheel speed value is determined based on information received from a vehicle system. A fault condition is detected based on deviations between the estimated wheel speed value for the fourth wheel and the calculated wheel speed value for the fourth wheel.

In another embodiment, the invention provides a wheel-speed monitoring system including three wheel speed sensors, a processor, and a memory. The memory stores instructions that are executed by the processor to control the operation of the wheel-speed monitoring system. The processor receives three wheel speed values—each from a different wheel speed sensor. Each of the three wheel speed values is indicative of a measured wheel speed of a different wheel. The processor determines an estimated wheel speed value for a fourth wheel based on at least one of the three wheel speed values. A calculated wheel speed value is also determined based on information received from a vehicle system. A fault condition is detected based on deviations between the estimated wheel speed value for the fourth wheel and the calculated wheel speed value for the fourth wheel.

In yet another embodiment, the invention provides a wheel-speed monitoring system that includes a processor and a memory. The memory stores instructions that are executed by the processor to control the operation of the wheel-speed monitoring system. The processor receives three wheel speed values—each from a different wheel speed sensor. Each of the three wheel speed values is indicative of a measured wheel speed of a different wheel. The processor then determines a plurality of estimated wheel speed values for a fourth wheel of the vehicle. Each estimated wheel speed value is calculated according to a different estimation mechanism based on at least one of the three measured wheel speed values for the other wheels. A calculated wheel speed value is also determined based on information received form a transmission output speed sensor. The processor calculates a plurality of deviation values—each based on one of the plurality of estimated wheel speed values and the calculated wheel speed value for the fourth wheel. The processor then compares each deviation value to a deviation threshold and determines a number of deviation values of the plurality of deviation values that exceed the deviation threshold. The processor concludes that a fault condition exists when the number of deviation values of the plurality of deviation values that exceed the deviation threshold exceeds a deviation quantity threshold for a defined period of time.

In some embodiments, the processor also determines whether unstable driving conditions exist and operates in a second monitoring mode when unstable driving conditions are detected. When operating in the second monitoring mode, the deviation threshold, the deviation quantity threshold, and the defined period of time are all increased to account for deviations due to external forces acting on the vehicle during unstable driving conditions.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
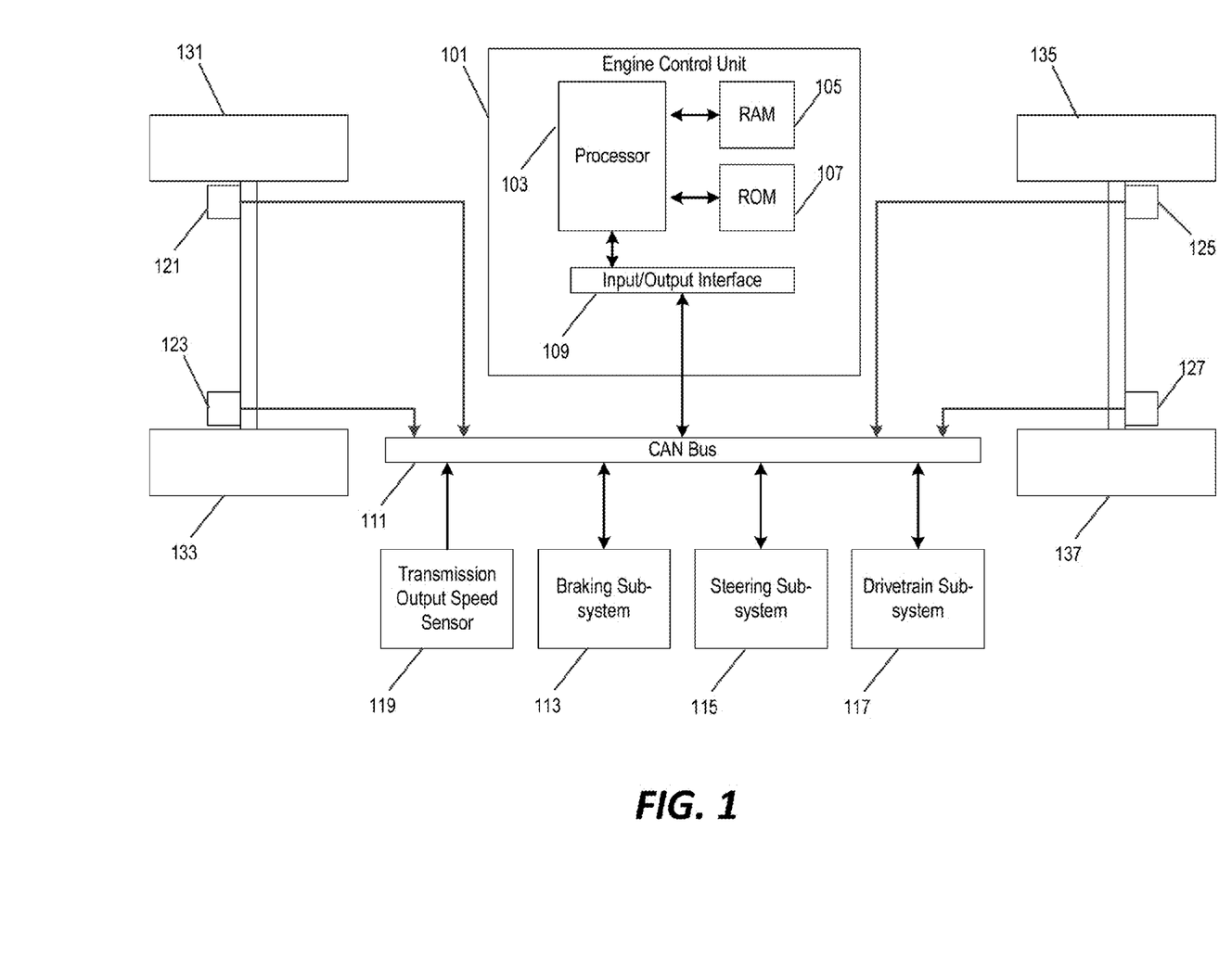
FIG. 1 is a schematic diagram of a vehicle control system according to one embodiment.

FIG. 1 illustrates a control system for a vehicle such as a four-wheeled car or truck. An engine control unit 101 ("ECU") analyzes information such as vehicle performance variables and engine actuator settings and controls one or more vehicle/engine operations based on the received data. The ECU 101 includes a processor 103 and one or more non-transitory, computer-readable memory modules. In the example of FIG. 1, the ECU 101 includes a random access memory ("RAM") module 105 and a read-only memory ("ROM") module 107. The ECU 101 also includes an input/output interface 109 that transmits and receives data over a controller area network ("CAN") bus 111. It should be understood that the ECU 101 can include multiple processors, additional computer-readable memory modules, multiple I/O interfaces, and/or additional components or modules (e.g., hardware, software, or a combination thereof).

The processor 103 receives information from the I/O interface 111 and processes the information by executing instructions for one or more software modules (which may also be referred to as a "controller" or "controllers") stored to a memory module of the ECU 101, such as the ROM 107 (which may also be referred to as a "controller" or "controllers"). The processor 103 stores information to and retrieves information from the RAM 105 (e.g., information received from other vehicle subsystems or sensors through the CAN bus 111 and information generated by modules executed by the processor 103). The non-transitory computer readable memory modules of the ECU 101 include volatile memory, non-volatile memory, or a combination thereof and, in various constructions, may also store operating system software, applications/instructions data, and combinations thereof.

Various other vehicle subsystems are also connected to the CAN bus 111 and communicate with the engine control unit 101, various vehicle sensors, and the other vehicle subsystems. For example, a braking sub-system 113 receives vehicle data and controls the braking pressure applied to each wheel of the vehicle (either symmetrically or asymmetrically). A steering sub-system 115 controls the steering angle applied to the front wheels of the vehicle based on the steering wheel position and other vehicle performance information. A drivetrain sub-system 117 controls the torque distribution applied to the wheels of the vehicle. Each of these vehicle sub-systems is connected to the CAN bus 111 and is capable of exchanging information with other devices connected to the CAN bus 111.

A number of vehicle sensors are also attached to the CAN bus 111. These vehicle sensors monitor various vehicle performance characteristics and provide information to other devices on the CAN bus 111. One such vehicle sensor is the transmission output speed sensor ("TOSS" sensor) 119. The TOSS sensor monitors the output speed of the transmission and, in combination with other information such as, for example, vehicle differential settings and data from the drivetrain sub-system 117, provides information that can be used to determine the wheel speed of each individual wheel of the vehicle. TOSS algorithms that are used to provide individual wheel speeds are known by those skilled in the art.

Also connected to the CAN bus 111 is a series of wheel speed sensors 121, 123, 125, and 127 each coupled to an individual wheel 131, 133, 135, and 137, respectively. Each wheel speed sensor monitors the speed of an individual wheel and provides information indicative of the wheel speed to the CAN bus 111. The vehicle sub-systems use the wheel speed information for each individual wheel to modify vehicle performance. For example, the engine control unit 101 may determine that unstable driving conditions are present and activate an electronic stability control ("ESC") program to distribute braking and torque to the wheels in a way that restores stability to the vehicle.

However, in some circumstances, wheel speed information is not available directly from sensors coupled each of the four vehicle wheels. For example, one of the four wheel speed sensors (e.g., wheel speed sensor 121 corresponding to the rear left wheel 131 of the vehicle) might fail during operation of the vehicle and provide no data to the CAN bus 111. Alternatively, to reduce costs, one of the four wheel speed sensors (e.g., wheel speed sensor 121 corresponding to the rear left wheel 131 of the vehicle) may be intentionally omitted from the vehicle entirely. In such circumstances, the ECU 101 estimates a wheel speed for the fourth wheel 133 based on wheel speed sensor readings for the other three wheels 133, 135, and 137.

The ECU 101 of FIG. 1 is configured to perform three concurrent estimation calculations to determine an estimated wheel speed of the fourth vehicle wheel 131 based on the wheel speed sensor readings for the other three wheels 133, 135, and 137. First, the ECU 101 calculates an estimated speed of the fourth wheel 131 as the average of the other three wheel speeds:

$$\overline{V_{3wss}} = \frac{V_{FL} + V_{FR} + V_{RR}}{3} \quad (1)$$

where $V_{3wss}$ is the estimated wheel speed of the fourth (rear left) wheel 131, $V_{FL}$ is the measured wheel speed of the front left wheel 135, $V_{FR}$ is the measured wheel speed of the front right wheel 137, and $V_{RR}$ is the measured wheel speed of the rear right wheel 133. It is noted that although the calculation presented in this example calculate the estimated wheel speed of the rear left wheel 131, alternative constructions can be used to estimate the wheel speed of any other wheel of the vehicle.

Next, the ECU 101 calculates an estimated speed of the fourth wheel 131 based on the average measured wheel speed for the wheels on the other axle. For example, to estimate the wheel speed of a wheel on the rear vehicle axle, the ECU 101 calculates the average wheel speed of the two front vehicle wheels 135, 137 based on the information from the front left wheel speed sensor 125 and the front right wheel speed sensor 127 according to the following equation:

$$\overline{V_{FA}} = \frac{V_{FL} + V_{FR}}{2} \quad (2)$$

where $V_{FA}$ is the estimated wheel speed of the fourth wheel 131 based on the front axle average, $V_{FL}$ is the measured wheel speed of the front left wheel 125, and $V_{FR}$ is the measured wheel speed of the front right wheel 127.

Finally, the ECU 101 calculates an estimated speed of the fourth wheel 131 by balancing the sum of the wheel speeds on each vehicle axle according to the equation:

$$V_{RL\_3wss} = V_{FL} + V_{FR} - V_{RR} \quad (3)$$

where $V_{RL\_3wss}$ is the estimated wheel speed of the fourth wheel 131, $V_{FL}$ is the measured wheel speed of the front left wheel 135, $V_{FR}$ is the measured wheel speed of the front right wheel 137, and $V_{RR}$ is the measured wheel speed of the rear right wheel 133.

The ESC program can operate based an estimated speed value for the fourth wheel calculated by any of equations (1), (2), or (3) above or an average of the three estimated values. Alternatively, as noted above, the TOSS sensor 119 provides information that can be used to calculate a wheel speed for each individual wheel (including the fourth, sensorless wheel) based on the output of the vehicle transmission. As such, the ESC program can use a wheel speed value calculated based on information from the TOSS sensor 119.

Figure 2:
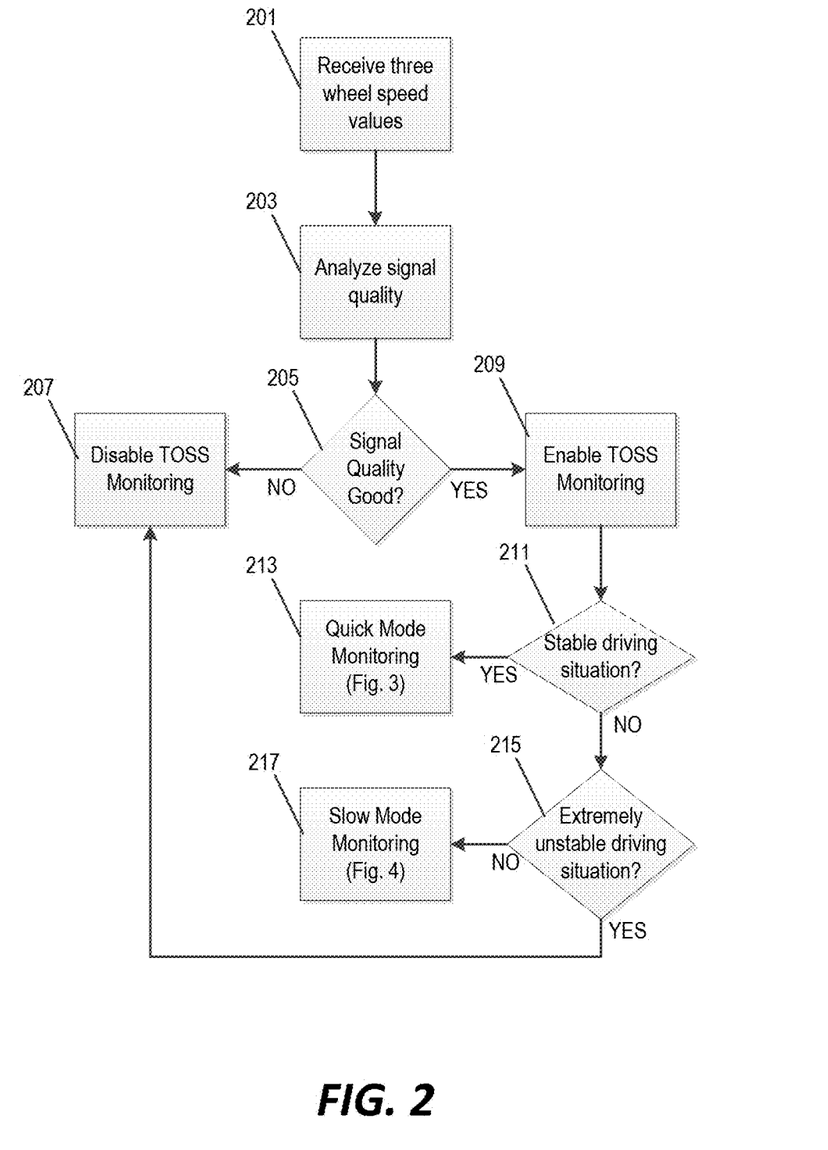
FIG. 2 is a flowchart of a method of monitoring estimated wheel speeds and deviations between estimated wheel speeds and calculated wheel speeds.

However, neither the estimated wheel speed values nor the TOSS sensor-based calculation provide a direct measurement of wheel speed for the fourth wheel. Furthermore, it is possible that an error condition in the TOSS sensor or elsewhere in the drivetrain can cause the wheel speed calculation to inaccurately represent the actual wheel speed of the fourth (sensorless) wheel. FIG. 2 illustrates a method of monitoring a speed value for the fourth wheel 131 calculated based on information from the TOSS sensor 119 and validating the calculated speed value based on the wheel speed values estimated based on the measured wheel speeds of the other four vehicle wheels 133, 135, and 137.

The ECU 101 receives wheel speed sensor values from each of the three existing/operational wheel speed sensors 123, 125, and 127 (step 201). The ECU 101 analyzes the signal quality from these sensors to determine whether they provide a reliable indication of measured wheel speeds (step 203). If the signal quality is unacceptable (step 205), the ECU 101 disables the TOSS monitoring mechanism described below (step 207). However, if the signal quality is adequate, the ECU 101 enables TOSS monitoring (step 209).

If driving situation is currently stable (e.g., steady speed, even road surface, no excessive turning) (step 211), the ECU 101 implements quick-mode monitoring to validate the estimated wheel speed based on TOSS output (step 213). However, if an unstable (or dynamic) driving situation is detected (step 211), the ECU 101 utilizes slow-mode TOSS monitoring (step 217). In some constructions, the ECU 101 determines that an unstable/dynamic driving condition is present when the ESC program (or other vehicle stability program) has been activated. Furthermore, in some constructions, the ECU 101 may determine that the driving conditions are so unstable that no accurate validation of the wheel speed calculation can be performed (step 215). In such conditions, the ECU 101 disables TOSS monitoring (step 207) until driving conditions stabilize.

Figure 3:
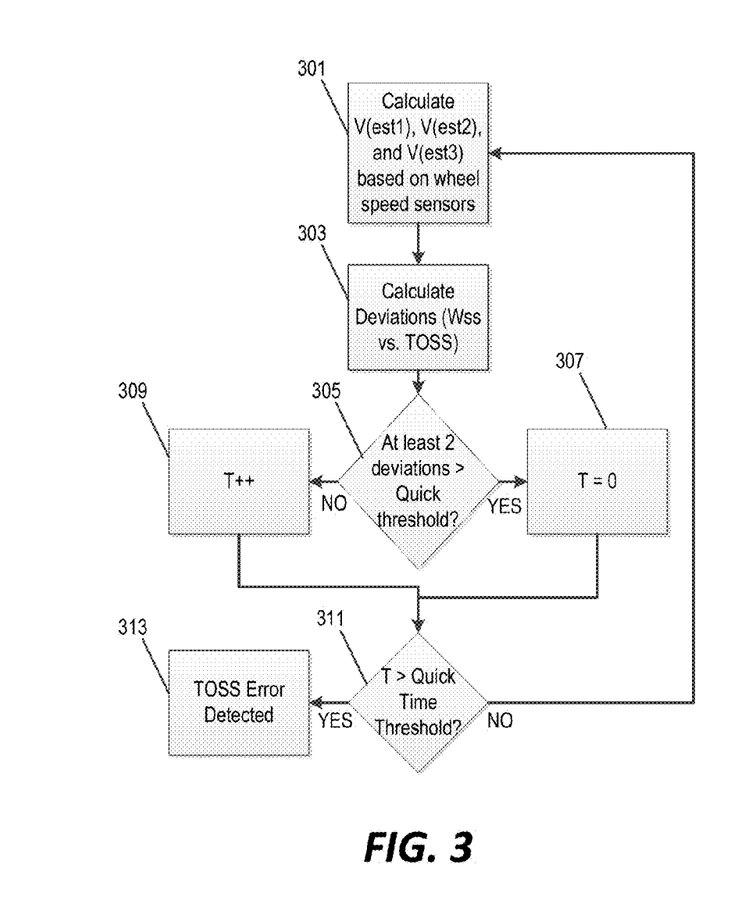
FIG. 3 is a flowchart of a method of comparing estimated wheel speed to calculated wheel speed during stable driving conditions.

FIG. 3 illustrates the quick-mode monitoring of the wheel speed calculation based on the output of the TOSS sensor 119. The quick mode operates under the assumption that, during more stable driving conditions, the wheel speed calculated based on the output of the TOSS sensor 119 can be validated more quickly and with greater sensitivity than when operating under unstable/dynamic driving conditions. The ECU 101 begins by calculating three estimated values for the speed of the fourth wheel based on equations (1), (2), and (3) described above (step 301). The ECU 101 then calculates a deviation value for each estimated wheel speed value as compared to the wheel speed value calculated based on the TOSS sensor 119 (step 303)—resulting in a total of three deviation values (one for each wheel speed estimation). The deviation values are each calculated according to the following equation:

$$\lambda = \frac{V_{RL\_TOSS} - V_{RL\_EST}}{V_{RL\_EST}} * 100\% \quad (4)$$

where $\lambda$ is the deviation value, $V_{RL\_TOSS}$ is the wheel speed value for the rear left wheel based on the output of the TOSS sensor 119, and $V_{RL\_EST}$ is the estimated wheel speed value for the rear left wheel (calculated according to one of the equations (1), (2), and (3) described above).

The ECU 101 then compares each of the three deviation values to a "quick mode" deviation threshold (step 305). The ECU 101 tracks the amount of time that at least two deviation values exceed the "quick mode" deviation threshold (step 309) and if the deviation continues for a defined "quick mode" time threshold (step 313), the ECU 101 determines that a fault condition exists and the wheel speed calculation for the fourth (sensorless) wheel cannot be relied upon (step 313). If at any time, fewer than two deviation values exceed the "quick mode" deviation threshold (step 305), the ECU 101 resets the time counter (step 307).

Figure 4:
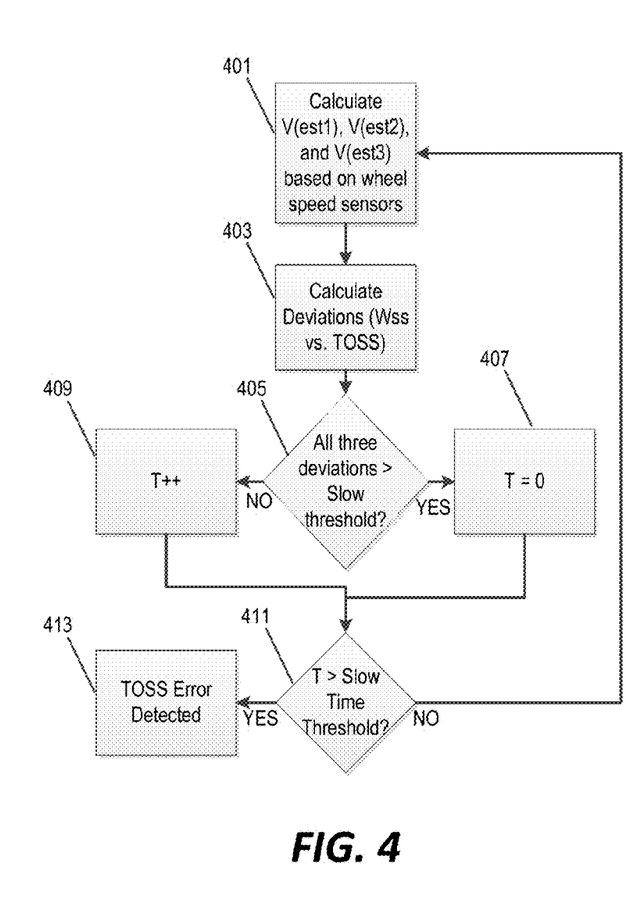
FIG. 4 is a flowchart of a method of comparing estimated wheel speed to calculated wheel speed during unstable or dynamic driving conditions.

FIG. 4 illustrates the slow-mode monitoring of the wheel speed calculation based on the output of the TOSS sensor 119. As noted above, "slow-mode" monitoring is used by the ECU 101 during unstable/dynamic driving conditions based on the assumption that deviations due to external factors are more likely to occur during unstable/dynamic driving conditions and, therefore, deviations must be detected for longer time periods with less sensitivity.

"Slow-mode" monitoring begins by calculating the three estimated values for the speed of the fourth wheel based on equations (1), (2), and (3) described above (step 401). The ECU 101 then calculates a deviation value for each estimated wheel speed value according to equation (4) above (step 403)—resulting in a total of three deviation values (one for each wheel speed estimation). The ECU 101 compares each deviation value to a "slow mode" deviation threshold (step 405) and tracks the amount of time that all three deviation values exceed a "slow mode" deviation threshold (step 409). Once at least one of the deviation values falls below the "slow mode" deviation threshold, the ECU 101 resets the timer (step 407). However, if the timer reaches a "slow mode" time threshold (step 411), the ECU 101 determines that a fault condition exists and the wheel speed calculation for the fourth (sensorless) wheel cannot be relied upon (step 413).

The "slow mode" monitoring is similar to the "quick mode" monitoring with a few key distinctions. First, the "slow mode" time threshold is longer than the "quick mode" time threshold. Therefore, during "slow mode" monitoring a deviation must exist for a longer period of time before the ECU 101 declares a fault condition. Furthermore, the "slow mode" deviation threshold is higher than the "quick mode" deviation threshold. As such, greater deviations between the estimated wheel speed values and the TOSS-based, calculated value before the ECU 101 declares a fault condition. Lastly, during "quick mode" monitoring, it is only necessary for two deviation values to exceed the deviation threshold while, during "slow mode" monitoring, all three deviation values must exceed the threshold. As noted above, during unstable/dynamic driving conditions, it is more likely that external factors will influence a deviation between estimated and calculated wheel speed values. These differences between "quick mode" and "slow mode" monitoring account for these external influences by requiring deviations between the estimated wheel speed values and the TOSS-based, calculated wheel speed value to be more pronounced and to exist for a longer period of time before a fault condition is declared while operating in "slow mode" monitoring.

Thus, the invention provides, among other things, systems and methods to monitor and validate a calculated wheel speed of a specific wheel of a vehicle based on deviations between the calculated wheel speed and measured wheel speeds of the other vehicle wheels. It is noted that, although the examples described above all relate to estimating a wheel speed value for the rear left wheel, the methods and systems described herein can be applied to estimate and validate the wheel speed for any vehicle wheel. Furthermore, although the examples above describe three specific equations for using measured wheel speed values for three wheels to calculate an estimated wheel speed value for the fourth wheel, other constructions of this invention can utilized different estimation mechanism and can utilize more or fewer than three estimation values. Various features and advantages of the invention are set forth in the following claims.

What is claimed is:

1. A method of monitoring a determined wheel speed of a wheel, the method comprising:
    receiving a first wheel speed value from a first wheel speed sensor, the first wheel speed value being indicative a measured wheel speed of a first wheel of a vehicle;
    receiving a second wheel speed value from a second wheel speed sensor, the second wheel speed value being indicative of a measured wheel speed of a second wheel of the vehicle;
    receiving a third wheel speed value from a third wheel speed sensor, the third wheel speed value being indicative of a measured wheel speed of a third wheel of the vehicle;
    determining an estimated wheel speed value for a fourth wheel of the vehicle based on at least two values selected from a group consisting of the first wheel speed value, the second wheel speed value, and the third wheel speed value;
    determining a calculated wheel speed value for the fourth wheel based on information received from a transmission output speed sensor; and
    determining that a fault condition exists based on deviations between the estimated wheel speed value for the fourth wheel and the calculated wheel speed value for the fourth wheel;
    wherein the estimated and calculated wheel speed values for the fourth wheel do not include any direct measurement of a wheel speed of the fourth wheel.

2. The method of claim 1, wherein determining an estimated wheel speed value for the fourth wheel includes
    calculating an average of the first wheel speed value, the second wheel speed value, and the third wheel speed value, and
    setting the estimated wheel speed value for the fourth wheel as the calculated average.

3. The method of claim 1, wherein determining an estimated wheel speed value for the fourth wheel includes
    calculating an average of the first wheel speed value and the second wheel speed value, wherein the first wheel and the second wheel are positioned at a front end of the vehicle and the third wheel and the fourth wheel are positioned at the rear end of the vehicle, and
    setting the estimated wheel speed value for the fourth wheel as the calculated average.

4. The method of claim 1, wherein determining an estimated wheel speed value for the fourth wheel includes
    subtracting the third wheel speed value from a sum of the first wheel speed value and the second wheel speed value, wherein the first wheel and the second wheel are positioned at a front end of the vehicle and the third wheel and the fourth wheel are positioned at the rear end of the vehicle, and
    setting the estimated wheel speed value for the fourth wheel as a result of the subtraction.

5. The method of claim 1, wherein determining that a fault condition exists based on deviations between the estimated wheel speed value for the fourth wheel and the calculated wheel speed value for the fourth wheel includes
    calculating a deviation value based on the estimated wheel speed value and the calculated wheel speed value,
    comparing the deviation value to a deviation threshold, and
    determining that a fault condition exists when the deviation value exceeds the deviation threshold for a defined period of time.

6. The method of claim 1, further comprising
    determining whether stable driving conditions exist,
        wherein the act of determining stable driving conditions exist includes determining whether a vehicle stability control program is activated, determining that stable driving conditions exist when the vehicle stability control program is not activated, and determining that unstable driving conditions exist when the vehicle stability control program is activated;
    operating in a first monitoring mode when stable driving conditions exist; and
    operating in a second monitoring mode when unstable driving conditions exist, and
    wherein determining that a fault condition exists based on deviations between the estimated wheel speed value for the fourth wheel and the calculated wheel speed value for the fourth wheel includes
        calculating a deviation value based on the estimated wheel speed value and the calculated wheel speed value,
        comparing the deviation value to a first deviation threshold when operating in the first monitoring mode,
        comparing the deviation value to a second deviation threshold when operating in the second monitoring mode, wherein the second deviation threshold is greater than the first deviation threshold,
        determining that a fault condition exists when the deviation value exceeds the first deviation threshold for a first defined period of time when operating in the first monitoring mode, and
        determining that a fault condition exists when the deviation value exceeds the second deviation threshold for a second defined period of time when operating in the second monitoring mode, wherein the second defined period of time is longer than the first defined period of time.

7. A wheel-speed monitoring system comprising:
    a first wheel speed sensor;
    a second wheel speed sensor;
    a third wheel speed sensor;
    a processor; and
    a memory storing instructions that, when executed by the processor, cause the wheel-speed monitoring system to
        receive a first wheel speed value from the first wheel speed sensor, the first wheel speed value being indicative a measured wheel speed of a first wheel of a vehicle,
        receive a second wheel speed value from the second wheel speed sensor, the second wheel speed value being indicative of a measured wheel speed of a second wheel of the vehicle,
        receive a third wheel speed value from the third wheel speed sensor, the third wheel speed value being indicative of a measured wheel speed of a third wheel of the vehicle,
        determine an estimated wheel speed value for a fourth wheel of the vehicle based on at least two values selected from the group consisting of the first wheel speed value, the second wheel speed value, and the third wheel speed value,
        determine a calculated wheel speed value for the fourth wheel based on information received from a transmission output speed sensor, and
        determine that a fault condition exists based on deviations between the estimated wheel speed value for the fourth wheel and the calculated wheel speed value for the fourth wheel;

wherein the estimated and calculated wheel speed values for the fourth wheel do not include any direct measurement of a wheel speed of the fourth wheel.

8. The wheel-speed monitoring system of claim 7, wherein the instructions, when executed by the processor, cause the wheel-speed monitoring system to determine an estimated wheel speed value for the fourth wheel by
calculating an average of the first wheel speed value, the second wheel speed value, and the third wheel speed value, and
setting the estimated wheel speed value for the fourth wheel as the calculated average.

9. The wheel-speed monitoring system of claim 7, wherein the instructions, when executed by the processor, cause the wheel-speed monitoring system to determine an estimated wheel speed value for the fourth wheel by
calculating an average of the first wheel speed value and the second wheel speed value, wherein the first wheel and the second wheel are positioned at a front end of the vehicle and the third wheel and the fourth wheel are positioned at the rear end of the vehicle, and
setting the estimated wheel speed value for the fourth wheel as the calculated average.

10. The wheel-speed monitoring system of claim 7, wherein the instructions, when executed by the processor, cause the wheel-speed monitoring system to determine an estimated wheel speed value for the fourth wheel by
subtracting the third wheel speed value from a sum of the first wheel speed value and the second wheel speed value, wherein the first wheel and the second wheel are positioned at a front end of the vehicle and the third wheel and the fourth wheel are positioned at the rear end of the vehicle, and
setting the estimated wheel speed value for the fourth wheel as a result of the subtraction.

11. The wheel-speed monitoring system of claim 7, wherein the instructions, when executed by the processor, cause the wheel-speed monitoring system to determine that a fault condition exists based on deviations between the estimated wheel speed value for the fourth wheel and the calculated wheel speed value for the fourth wheel by
calculating a deviation value based on the estimated wheel speed value and the calculated wheel speed value,
comparing the deviation value to a deviation threshold, and
determining that a fault condition exists when the deviation value exceeds the deviation threshold for a defined period of time.

12. The wheel-speed monitoring system of claim 7, wherein the instructions, when executed by the processor, further cause the wheel-speed monitoring system to
determine whether stable driving conditions exist,
wherein the instructions, when executed by the processor, cause the wheel-speed monitoring system to determine whether stable driving conditions exist by determining whether a vehicle stability control program is activated, determining that stable driving conditions exist when the vehicle stability control program is not activated, and determining that unstable driving conditions exist when the vehicle stability control program is activated;
operate in a first monitoring mode when stable driving conditions exist; and
operate in a second monitoring mode when unstable driving conditions exist, and
wherein the instructions, when executed by the processor, cause the wheel-speed monitoring system to determine that a fault condition exists based on deviations between the estimated wheel speed value for the fourth wheel and the calculated wheel speed value for the fourth wheel by
calculating a deviation value based on the estimated wheel speed value and the calculated wheel speed value,
comparing the deviation value to a first deviation threshold when operating in the first monitoring mode,
comparing the deviation value to a second deviation threshold when operating in the second monitoring mode, wherein the second deviation threshold is greater than the first deviation threshold,
determining that a fault condition exists when the deviation value exceeds the first deviation threshold for a first defined period of time when operating in the first monitoring mode, and
determining that a fault condition exists when the deviation value exceeds the second deviation threshold for a second defined period of time when operating in the second monitoring mode, wherein the second defined period of time is longer than the first defined period of time.

13. A wheel-speed monitoring system comprising a processor and a memory, the memory storing instructions that, when executed by the processor, cause the wheel-speed monitoring system to:
receive a first wheel speed value from a first wheel speed sensor, the first wheel speed value being indicative a measured wheel speed of a first wheel of a vehicle;
receive a second wheel speed value from a second wheel speed sensor, the second wheel speed value being indicative of a measured wheel speed of a second wheel of the vehicle;
receive a third wheel speed value from a third wheel speed sensor, the third wheel speed value being indicative of a measured wheel speed of a third wheel of the vehicle;
determine a plurality of estimated wheel speed values for a fourth wheel of the vehicle, wherein each estimated wheel speed value of the plurality of estimated wheel speed values is determined according to a different estimation mechanism based on at least two value selected from the group consisting of the first wheel speed value, the second wheel speed value, and the third wheel speed value;
determine a calculated wheel speed value for the fourth wheel based on information received from a transmission output speed sensor;
calculate a plurality of deviation values, wherein each deviation value is based on a difference between one of the plurality of estimated wheel speed values and the calculated wheel speed value for the fourth wheel;
compare each deviation value of the plurality of deviation values to a deviation threshold;
determine a number of deviation values of the plurality of deviation values that exceed the deviation threshold; and
determine that a fault condition exists when the number of deviation values of the plurality of deviation values that exceed the deviation threshold exceeds a deviation quantity threshold for a defined period of time;
wherein the estimated and calculated wheel speed values for the fourth wheel do not include any direct measurement of a wheel speed of the fourth wheel.

14. The wheel-speed monitoring system of claim 13, wherein the instructions, when executed by the processor, further cause the wheel-speed monitoring system to:
determine whether unstable driving conditions exist, and
wherein the instructions, when executed by the processor, cause the wheel-speed monitoring system to determine whether stable driving conditions exist by determining whether a vehicle stability control program is activated, determining that stable driving conditions exist when the vehicle stability control program is not activated, and determining that unstable driving conditions exist when the vehicle stability control program is activated;

operate in a second monitoring mode when unstable driving conditions exist;

compare each deviation value of the plurality of deviation values to a second deviation threshold when operating in the second monitoring mode, wherein the second deviation threshold is greater than the first deviation threshold;

determine a number of deviation values of the plurality of deviation values that exceed the second deviation threshold when operating in the second monitoring mode; and determine that a fault condition exists when the number of deviation values of the plurality of deviation values that exceed the second deviation threshold exceeds a second deviation quantity threshold for a second defined period of time when operating in the second monitoring mode, wherein the second deviation quantity threshold is greater than the deviation quantity threshold, and wherein the second defined period of time is greater than the defined period of time.

15. The wheel-speed monitoring system of claim 13, wherein the plurality of estimated wheel speed values for the fourth wheel includes a first estimated wheel speed value for the fourth wheel, a second estimated wheel speed value for the fourth wheel, and a third estimated wheel speed value for the fourth wheel, wherein the instructions, when executed by the processor, cause the wheel-speed monitoring system to determine a plurality of estimated wheel speed values for the fourth wheel by calculating an average of the first wheel speed value, the second wheel speed value, and the third wheel speed value, setting the first estimated wheel speed value for the fourth wheel as the calculated average of the first wheel speed value, the second wheel speed value, and the third wheel speed value, calculating an average of the first wheel speed value and the second wheel speed value, wherein the first wheel and the second wheel are positioned at a front end of the vehicle and the third wheel and the fourth wheel are positioned at the rear end of the vehicle, setting the second estimated wheel speed value for the fourth wheel as the calculated average of the first wheel speed value and the second wheel speed value, subtracting the third wheel speed value from a sum of the first wheel speed value and the second wheel speed value, and setting the third estimated wheel speed value for the fourth wheel as a result of the subtraction, and wherein the instructions, when executed by the processor, cause the wheel-speed monitoring system to calculate a plurality of deviation values by calculating a first deviation value based on a difference between the first estimated wheel speed value for the fourth wheel and the calculated wheel speed value for the fourth wheel, calculating a second deviation value based on a difference between the second estimated wheel speed value for the fourth wheel and the calculated wheel speed value for the fourth wheel, and calculating a third deviation value based on a difference between the third estimated wheel speed value for the fourth wheel and the calculated wheel speed value for the fourth wheel.

16. The wheel-speed monitoring system of claim 15, wherein the deviation quantity threshold equals one, and wherein the instructions, when executed by the processor, cause the wheel-speed monitoring system to determine that a fault condition exists when at least one deviation value selected from the group consisting of the first deviation value, the second deviation value, and the third deviation value exceeds the deviation threshold for a defined period of time.

* * * * *